Aug. 2, 1960 F. P. TURVEY, JR 2,947,944

GATED TRIGGER PREDETERMINED BINARY COUNTER

Filed May 11, 1956 2 Sheets-Sheet 1

INVENTOR
FRANK P. TURVEY, JR.
BY Philip M. Bolton
ATTORNEY

Aug. 2, 1960 F. P. TURVEY, JR 2,947,944

GATED TRIGGER PREDETERMINED BINARY COUNTER

Filed May 11, 1956 2 Sheets-Sheet 2

INVENTOR
FRANK P. TURVEY, JR
BY Philip M. Bolton
ATTORNEY

United States Patent Office 2,947,944

Patented Aug. 2, 1960

2,947,944

GATED TRIGGER PREDETERMINED BINARY COUNTER

Frank P. Turvey, Jr., Nutley, N.J., assignor to International Telephone and Telegraph Corporation, Nutley, N.J., a corporation of Maryland Filed May 11, 1956, Ser. No. 584,243

2 Claims. (Cl. 328—42)

This invention relates to a counter or scaler type of circuit and, in more particular, to a counter circuit which uses a chain of binary stages so arranged as to count up to an arbitrary figure.

Conventional binary chain counters count up to a number which is arrived at by taking the number two (2) and raising it to a power equal to the total number of complete bistable stages and substracting by one, or $2^n-1$ where ($n$) is the number of bistable stages used. The number of pulses thus counted by the ordinary binary chain type of counter is the number $2^n-1$ before it returns to its zero (0) counting position. However, if it were desired to count more or less than this number $2^{n-1}$ before returning to the zero position, additional circuitry would be required, such as, for example, circuitry providing resetting pulses and feedback arrangements from one of the later stages to an earlier stage. Such arrangements can become very complex, depending on the relation of the desired count to the normal count of such a chain, and may seriously interfere with the reliability of the count.

Considerable usage may be found for counters or scalers having circuitry which can readily provide an arbitrarily selected count. For example, in television systems, at the end of each complete frame, after 525 horizontal synchronizing pulses, a single-frame synchronizing pulse is required. Other uses would be in the matter of arbitrarily counting a fixed number of articles and producing after a predetermined number a pulse which may be used for some control or indication function as, for example, closing some gating circuit to produce a signal or to operate a mechanical device.

To overcome the rigidity of counting in conventional binary counters, novel means as contemplated by this invention are provided for controlling the trigger input pulses to the various stages of a binary chain to give the desired output count.

Therefore, it is an object of this invention to provide an improved type of counter circuit.

Another object of this invention is to provide a novel counter using a conventional chain of binary stages arranged so as to count up to an arbitrary figure.

Still another object of this invention is to provide a counter having novel interstage control circuits for controlling the output count.

Figure 1:
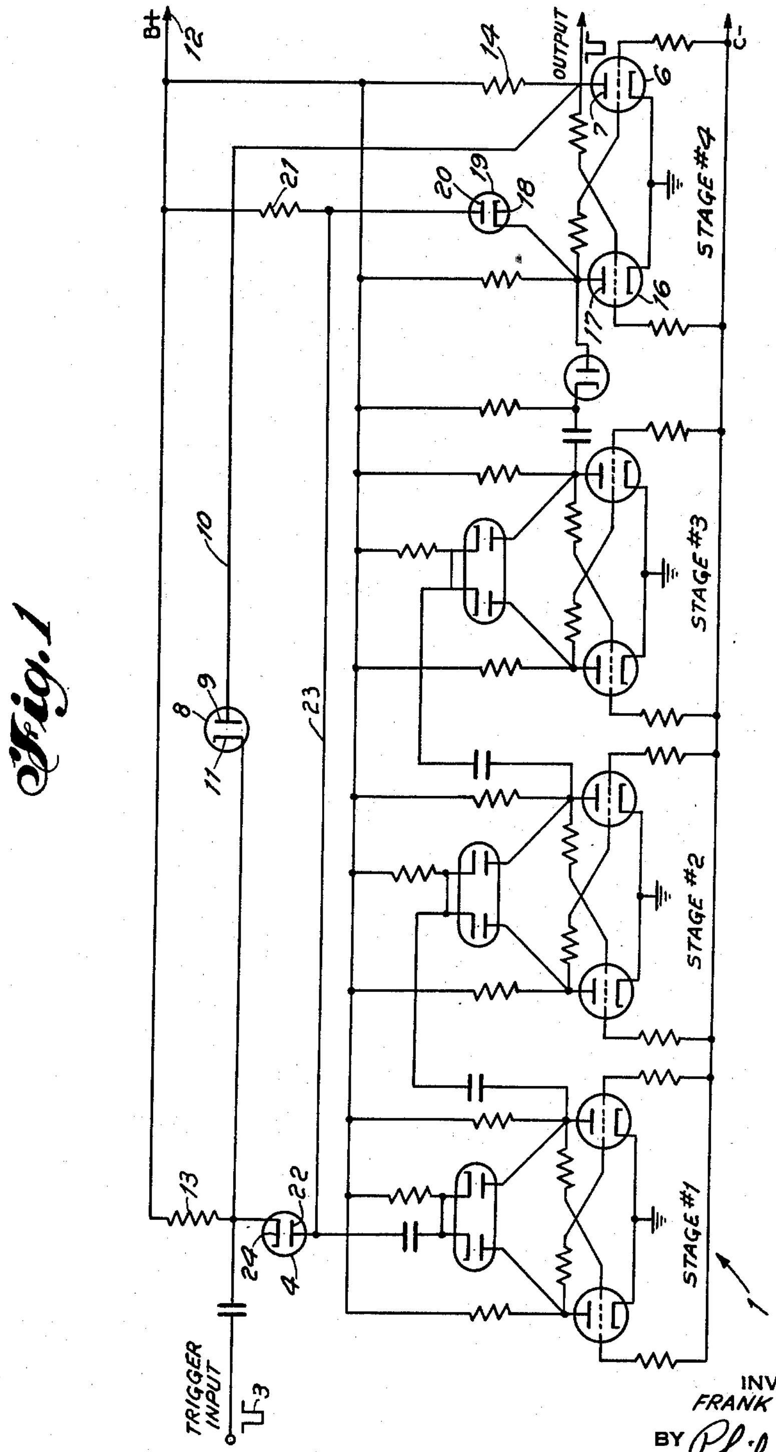
Figure 2:
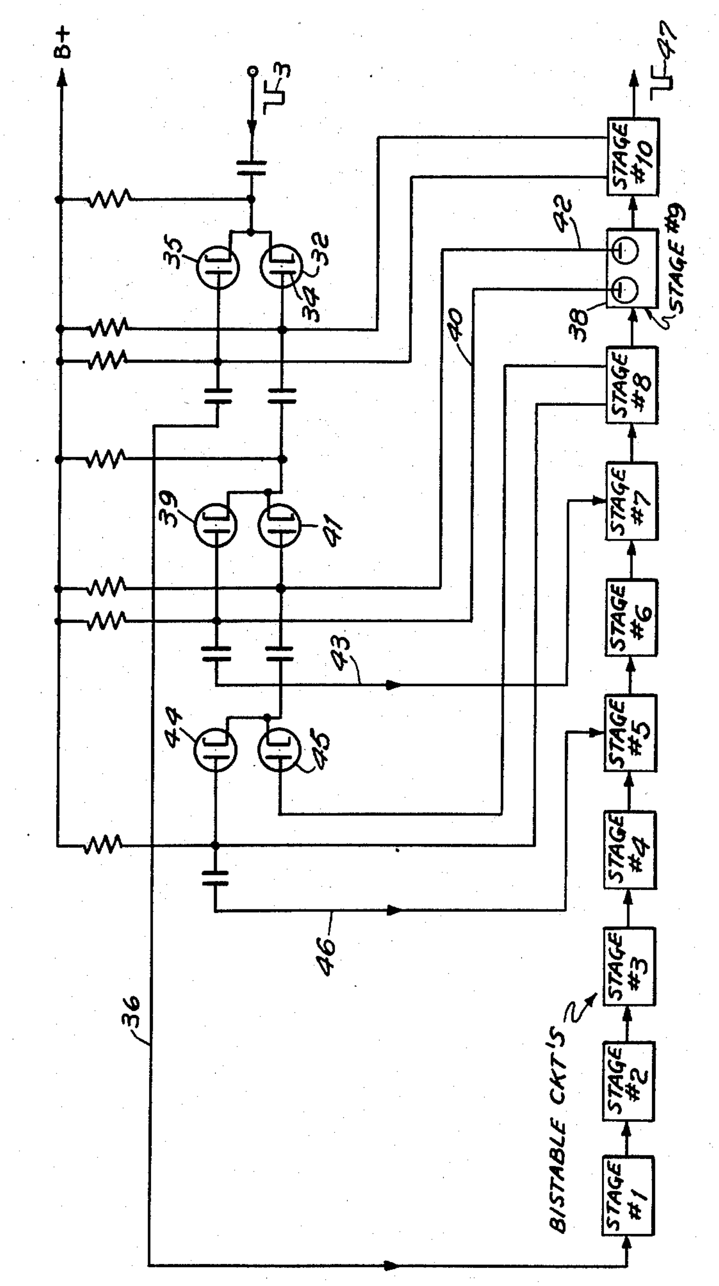

Still further objects and advantages together with the organization and method of operation of the invention may best be understood by reference to the following description taken in connection with the accompanying drawings, wherein:

Fig. 1 shows schematically an embodiment of the invention for a scaler or counter circuit of 9 to 1; and Fig. 2 shows schematically another embodiment of the invention for a scaler or counter circuit of 525 to 1.

Referring to Fig. 1, there is shown a binary counter chain comprised of four bistable flip-flop or multivibrator type of circuits 1 each arranged so that the preceding stage triggers the following stage setting off a train of pulses in the output circuit which is a submultiple of the number of pulses fed to the input circuit. Each stage is a two-to-one divider since it requires two input pulses to recover one output pulse at the output. This method of operation is conventional to flip-flop circuits.

In operation, the normal count would be fifteen; and the sixteenth pulse would produce an output pulse at which time the chain is returned to its zero counting position ready to start another sequence or count. Hence, such conventional chains normally count to $(2^n-1)$; or as shown in Fig. 1, the four stages would count to $2^4-1=15$. To make this four-stage chain count to 9, or $2^{n-1}+1$, more novel trigger control circuits are provided as contemplated by this invention. Further as herein used, the term scaler refers to an arrangement that produces one output pulse for a given number of input pulses.

Again with reference to Fig. 1, negative input triggering pulses 3 are fed to the input of stage 1 of the binary chain through diode 4, which is normally biased in the direction to permit the conduction of the negative pulses 3. At the normal start of the count, or the zero position, the last stage of the binary chain or stage 4, the electron tube 6 is in a conductive state, which places its anode 7 at a reduced voltage, as compared to the supply voltage 12 when the said electron tube 6 is non-conductive. The diode 8 has its anode 9 connected via lead 10 to the anode 7 of the electron tube 6 so that its voltage is the same as that of the anode 7. The cathode 11 of the diode 8 is connected to the supply voltage 12 through the resistor 13 and held at this voltage inasmuch as no conduction takes place through the resistor 13, hence no resulting voltage drop. When electron tube 6 is conductive, the anode 7 drops in voltage an amount equal to the voltage drop across its load resistor 14 from the initial supply voltage 12. This conduction on the part of electron tube 6 causes the diode 8 to become blocked or biased in a direction which prevents any negative pulses 3 to pass or be conducted therethrough. Now, as the count commences from zero, the input pulses are conducted through the various binary stages in the normal and conventional sequence of scale-of-two divider chains so that, as the $(2^n-1)$th trigger impulse triggers the final stage 4 to the "on condition," i.e., the electron tube 16 being conductive, the electron tube 6 will be non-conductive or biased to cut-off. The anode 17, because of the conductive state of the electron tube 16, is reduced in voltage as compared to its voltage in the non-conductive state. This consequently puts the cathode 18 of the diode 19, which is connected to the anode 17, at a lower voltage relative to the voltage at the anode 20 of diode 19. The anode 20 of diode 19 is connected to the supply voltage 12 through resistor 21. The conduction of diode 19, resulting from the conduction of electron tube 16, causes a voltage drop to appear across resistor 21. This voltage difference across resistor 21 also appears across the diode 4 since the anode 22 of diode 4 is tied via lead 23 to the anode 20 of diode 19 and the cathode 24 of diode 4 tied to the other end of resistor 21 through the resistor 13. Hence, because of this voltage difference across the resistor 21, the anode 22 will be at a lower potential than the cathode 24, thereby causing the diode 4 to be non-conductive or cut-off. This condition prevents any negative pulses 3 from being transmitted to the binary stages as are normally transmitted. Because in the final stage 4 the electron tube 6 is non-conductive, the diode 8 will be biased in a direction to cause conduction, or become unblocked, permitting the $(2^{n-1}+1)$th pulse to be transmitted therethrough and hence to the anode 7 of the electron tube 6. The $(2^{n-1}+1)$th pulse is the output pulse which represents the count-down or divider output number. By feeding the $(2^{n-1}+1)$th pulse to the anode 7 of electron tube 6, the tube becomes conductive, this because of the feedback arrangement in stage 4 normal to bistable circuits. This causes diode 8 to once again become blocked or biased for non-conduction; and the counting sequence starts over again.

Referring now to Fig. 2, another embodiment of the invention is shown which pertains to a scaler counter circuit for counting up to 525. There are ten bistable stages represented in block form, each bistable stage being similar to the stages illustrated in Fig. 1 and operated in the same manner, e.g., each stage divides by two in the normal manner. Normally, without any special interstage triggering means, the binary chain would count to the $2^n-1$ pulse before returning to its zero counting position. Consequently, to provide a counter or scaler which would count to 525 a ten stage counter is used since a nine stage counter would reach a full count at 512. In order to count to 525 instead of the conventional 1023 that the normal counter arrangement would provide, biasing diodes are so strategically located as to provide trigger impulses to various inter-stages of the binary chain in accordance with this invention.

More specifically, diode 32 is blocked, as previously explained in connection with Fig. 1, due to the face that the right-hand triode of the final stage 10 is conductive. This consequently places a negative potential on the anode 34 of diode 32. Initially, negative trigger pulses 3 are passed by diode 35 to the input of the binary chain via lead 36 and blocked by diode 32. The 512th trigger pulse flips binary stage 10 on and all preceding stages off, which is normal to this type of counter. Therefore, the 512th pulse permits the diode 32 to become unblocked allowing trigger pulses to come through and, simultaneously therewith, causes diode 35 to become blocked because of the non-conductive portion of stage 10 as heretofore explained.

Stage 9 during the 512th pulse is off, that is, its left side 38 is non-conductive so that diode 39 which is connected thereto through lead 40 becomes unblocked thus permitting pulses 3 to pass through the diode 39. At the same time, diode 41 is in a blocked condition because the right side of stage 9 which is conductive is directly connected via lead 42 to anode of the diode 41.

Those pulses permitted to pass through the diode 39 are transmitted to the input of stage 7 via lead 43 to control its switching action. Therefore, the next three pulses, e.g., 513, 514 and 515, will turn on stages 7 and 8. The following trigger pulse, e.g., 516th pulse, will turn stages 7 and 8 off; but stage 9 will be turned on. This means that the diodes 39 and 41 will reverse their biased conditions to the biased conditions that prevailed when the 512th pulse was transmitted. Hence, diode 41 will permit the transmission of pulses 3 whereas diode 39 will be blocked, not permitting the passage of any pulses therethrough. At this particular time, stage 8 will be turned off so that the left-hand electron tube of stage 8 will be non-conductive thus permitting diode 44 to conduct and diode 45 to be non-conductive or blocked. Consequently, those pulses passed by diode 44 will be transmitted to the input of stage 5 via lead 46. Commencing with pulse number 517, the next seven pulses will count as previously through stages 5, 6 and 7. On the eighth (8th) pulse, or pulse number 524, stage number 8 will be turned on so that the diodes 44 and 45 will reverse themselves with respect to their previous condition. That is, the diode 44 will be non-conductive; and the diode 45 will begin to conduct. Therefore, on the 525th pulse transmitted through the diode 45, the stages 8, 9 and 10 will be turned off so that the cycle will be completed; and the scaler again will be in its initial state ready to begin the counting sequence anew. An output pulse 47 will be transmitted by the final stage, stage number 10, by virtue of the fact that the right-hand electron tube of stage 10 undergoes a transition from the non-conductive to the conductive state. At the beginning of the count, the right-hand electron tube of the last stage is conductive so that at the 512th pulse it becomes non-conductive; but this essentially produces no output voltage. However, at the 525th pulse as above stated, an output will be produced as a result of the transition from non-conductive to conductive operation of the right-hand electron tube of the last stage 10 in accordance with this invention.

Although only certain embodiments of the invention have been described and illustrated in the specification and accompanying drawings, it is to be expressly understood that the invention is not limited thereto. Various other changes may be made in the design and arrangement of parts illustrated without departing from the spirit and scope of the invention as will now be understood by those skilled in the art.

I claim:

1. A scaler-type counter arranged to produce an arbitrary count and comprising a plurality of cascaded bistable multivibrator stages, each stage having a pair of current-controlling devices one conducting and the other non-conducting and reversing their conduction in respose to input pulses, a pulse source, a first diode coupled to receive pulses from said pulse source and apply them to a first of said stages to initiate a count, a second diode coupled directly between said pulse source and a first current-controlling device of another of said stages, the said first current-controlling device being conductive at the beginning of the count to block said second diode, and a third diode connected to a second current-controlling device of said other multivibrator stage and the said first diode, said third diode being connected to said first diode and becoming conductive in response to current changes in said second current-controlling device to thereby cause said first diode to become blocked and the said second diode to become unblocked, the next input pulse being transmitted to said other stage to cause the said first current-controlling device to conduct and commence the sequence again, the first and second diodes having their like electrodes connected together, and said third and second diodes having their unlike electrodes connected to the devices of said other stage, whereby feedback of pulses from said other stage will switch the first diode.

2. A binary counter system adapted to an arbitrary number comprising a binary counting chain including a plurality of cascaded bistable stages, a source of pulses to be counted, a first diode coupled to pass pulses to the first stage of said counting chain, a second diode coupled directly to said source to receive pulses from said source, circuitry means coupling a predetermined stage to said first and second diodes, said predetermined stage in its first bistable state conditioning said second diode to block pulses passing therethrough and render said first diode unblocked, said predetermined stage in its second bistable state conditioning the first diode to block pulses passing therethrough and said second diode to permit pulses to pass therethrough and said counter chain arranged such that said predetermined stage is transferred to its second stable state by the pulse representative of said arbitrary number less one thus conditioning said diodes to permit a pulse representing the arbitrary number to pass through said second diode to transfer said predetermined stage to its first bistable state while blocking said arbitrary numbered pulse from being passed to said counter first stage and a third diode connected to said last named stage and to said first diode, said predetermined stage comprising a pair of tubes having anodes, said anodes being connected to oppositely poled electrodes of the second and third diodes respectively for feedback of pulses to the first stage, said first and third diodes having their electrodes of like polarity connected together, said first and second diodes having their like poled electrodes connected together.

(References on following page)

References Cited in the file of this patent

UNITED STATES PATENTS

| | | |
|---|---|---|
| 2,521,788 | Grosdoff | Sept. 12, 1950 |
| 2,584,363 | Mumma | Feb. 5, 1952 |
| 2,584,811 | Phelps | Feb. 5, 1952 |
| 2,832,541 | Guttridge | Apr. 29, 1958 |

FOREIGN PATENTS

| | | |
|---|---|---|
| 584,422 | Great Britain | Jan. 14, 1947 |

OTHER REFERENCES

Electronics, February 1953, vol. 26, pp. 145–147, "Gated Decade Counter Requires No Feedback," by E. L. Kemp (Fig. 3, p. 146 relied on).